US006704787B1

United States Patent
Umbreit

(10) Patent No.: US 6,704,787 B1
(45) Date of Patent: Mar. 9, 2004

(54) DATE OF BIRTH AUTHENTICATION SYSTEM AND METHOD USING DEMOGRAPHIC AND/OR GEOGRAPHIC DATA SUPPLIED BY A SUBSCRIBER THAT IS VERIFIED BY A THIRD PARTY

(75) Inventor: Timothy F. Umbreit, Studio City, CA (US)

(73) Assignee: Intercard Payments, Inc., Encino, CA (US)

( * ) Notice: Subject to any disclaimer, the term of this patent is extended or adjusted under 35 U.S.C. 154(b) by 0 days.

(21) Appl. No.: 09/455,008

(22) Filed: Dec. 3, 1999

(51) Int. Cl.[7] .............................................. G06F 15/16
(52) U.S. Cl. ...................... 709/229; 709/203; 709/225; 710/36; 710/244; 340/512; 725/22; 725/30; 713/156; 713/161; 713/175; 713/182; 713/201; 707/9
(58) Field of Search ................................ 709/203, 219, 709/225, 229; 710/36, 244; 340/5.1, 5.2; 725/22, 30; 713/155, 156, 161, 175, 182, 185, 201; 707/9

(56) References Cited

U.S. PATENT DOCUMENTS

| 5,483,596 | A | * | 1/1996 | Rosenow et al. | |
|---|---|---|---|---|---|
| 5,678,041 | A | * | 10/1997 | Baker et al. | |
| 5,708,780 | A | * | 1/1998 | Levergood et al. | |
| 5,822,539 | A | * | 10/1998 | van Hoff | |
| 5,848,231 | A | * | 12/1998 | Teitelbaum et al. | |
| 5,948,061 | A | * | 9/1999 | Merriman et al. | 709/219 |
| 5,959,623 | A | * | 9/1999 | van Hoff et al. | |
| 5,983,270 | A | * | 11/1999 | Abraham et al. | |
| 6,003,135 | A | * | 12/1999 | Bialick et al. | 713/201 |
| 6,018,724 | A | * | 1/2000 | Arent | |
| 6,029,150 | A | * | 2/2000 | Kravitz | |
| 6,047,377 | A | * | 4/2000 | Gong | 713/201 |
| 6,141,694 | A | * | 10/2000 | Gardner | |
| 6,141,778 | A | * | 10/2000 | Kane et al. | |
| 6,148,404 | A | * | 11/2000 | Yatsukawa | |
| 6,154,741 | A | * | 11/2000 | Feldman | |
| 6,157,953 | A | * | 12/2000 | Chang et al. | 709/225 |
| 6,161,139 | A | * | 12/2000 | Win et al. | 709/225 |
| 6,178,510 | B1 | * | 1/2001 | O'Connor et al. | 713/201 |

(List continued on next page.)

OTHER PUBLICATIONS

Jean Hellwege, *Library Internet Filtering Policy Unconstitutional, Court Rules*, Trial, Feb. 1, 1999.
*Libraries Under Pressure To Install Internet Filter*, http://www.sjmercury.com/svtech/new/breaking/merc/docs/072712.htm, Dec. 10, 1999.

(List continued on next page.)

Primary Examiner—Rupal Dharia
Assistant Examiner—Stephan Willett
(74) Attorney, Agent, or Firm—McDermott, Will & Emery

(57) ABSTRACT

A system or method for an access code issuer to receive an on-line application including certain personal information from a user of a computer network such as the Internet, to independently operatively connect to a database and obtain or verify demographic and additional personal information regarding the user, and issue an access code to the user. The user enters this access code when accessing various nodes or websites of a plurality of affiliated content providers. The content providers obtain or verify the user's demographics by operatively connecting to the access code issuer, thereby obtaining or verifying the demographics of the visitor to its site without requiring the visitor to enter his or her demographic information or to independently provide proof thereof to the content provider. The content provider can then customize the presentation and advertising on its site according to the demographics of the user, and/or can restrict access to its site or portions thereof based on demographics or other information regarding the user.

23 Claims, 2 Drawing Sheets

U.S. PATENT DOCUMENTS

| | | | |
|---|---|---|---|
| 6,182,142 B1 * | 1/2001 | Win et al. ............... | 709/229 |
| 6,185,586 B1 * | 2/2001 | Judson | |
| 6,196,460 B1 * | 3/2001 | Shin | |
| 6,223,291 B1 * | 4/2001 | Puhl et al. .............. | 713/201 |
| 6,226,744 B1 * | 5/2001 | Murphy et al. | |
| 6,256,739 B1 * | 7/2001 | Skopp et al. ............ | 713/201 |
| 6,272,631 B1 * | 8/2001 | Thomlinson et al. ..... | 713/155 |
| 6,275,925 B1 * | 8/2001 | Matsumoto et al. | |
| 6,304,892 B1 * | 10/2001 | Bhoj et al. | |
| 6,304,907 B1 * | 10/2001 | Keronen et al. .......... | 709/229 |
| 6,332,134 B1 * | 12/2001 | Foster | |
| 6,336,186 B1 * | 1/2002 | Dyksterhouse et al. ... | 713/156 |
| 6,353,886 B1 * | 3/2002 | Howard et al. .......... | 713/156 |
| 6,421,669 B1 * | 7/2002 | Gilmour et al. | |
| 6,463,416 B1 * | 10/2002 | Messina | |
| 2001/0034718 A1 * | 10/2001 | Shaked et al. | |
| 2001/0037378 A1 * | 11/2001 | Hirayama ................ | 709/219 |
| 2001/0056487 A1 * | 12/2001 | Yoo ........................ | 709/225 |
| 2002/0002688 A1 * | 1/2002 | Gregg et al. | |
| 2002/0016790 A1 * | 2/2002 | Arnold et al. | |
| 2002/0019828 A1 * | 2/2002 | Mortl | |
| 2002/0023232 A1 * | 2/2002 | Serani et al. | |
| 2002/0029196 A1 * | 3/2002 | Metcalf et al. | |
| 2002/0029347 A1 * | 3/2002 | Edelman | |
| 2002/0031230 A1 * | 3/2002 | Sweet et al. | |
| 2002/0046122 A1 * | 4/2002 | Barber et al. | |
| 2002/0049806 A1 * | 4/2002 | Gatz et al. ............... | 709/203 |
| 2002/0056049 A1 * | 5/2002 | Vinati et al. ............. | 713/201 |
| 2002/0087893 A1 * | 7/2002 | Shpiro et al. | |

OTHER PUBLICATIONS

*AARP Membership Application and Benefits Description,* http://www.arp.org, Nov. 4,.

*FTC Requires Parental Consent In COPPA Rules,* http://gov.../newspage.shtm?story=October211999FTCRequiresParentalConsentInCOPPARule, Nov. 4, 1999.

*The Adult Check® System,* home page http://www.adultcheck.com (Nov. 4, 1999) and application page (Dec. 4, 1999).

* cited by examiner

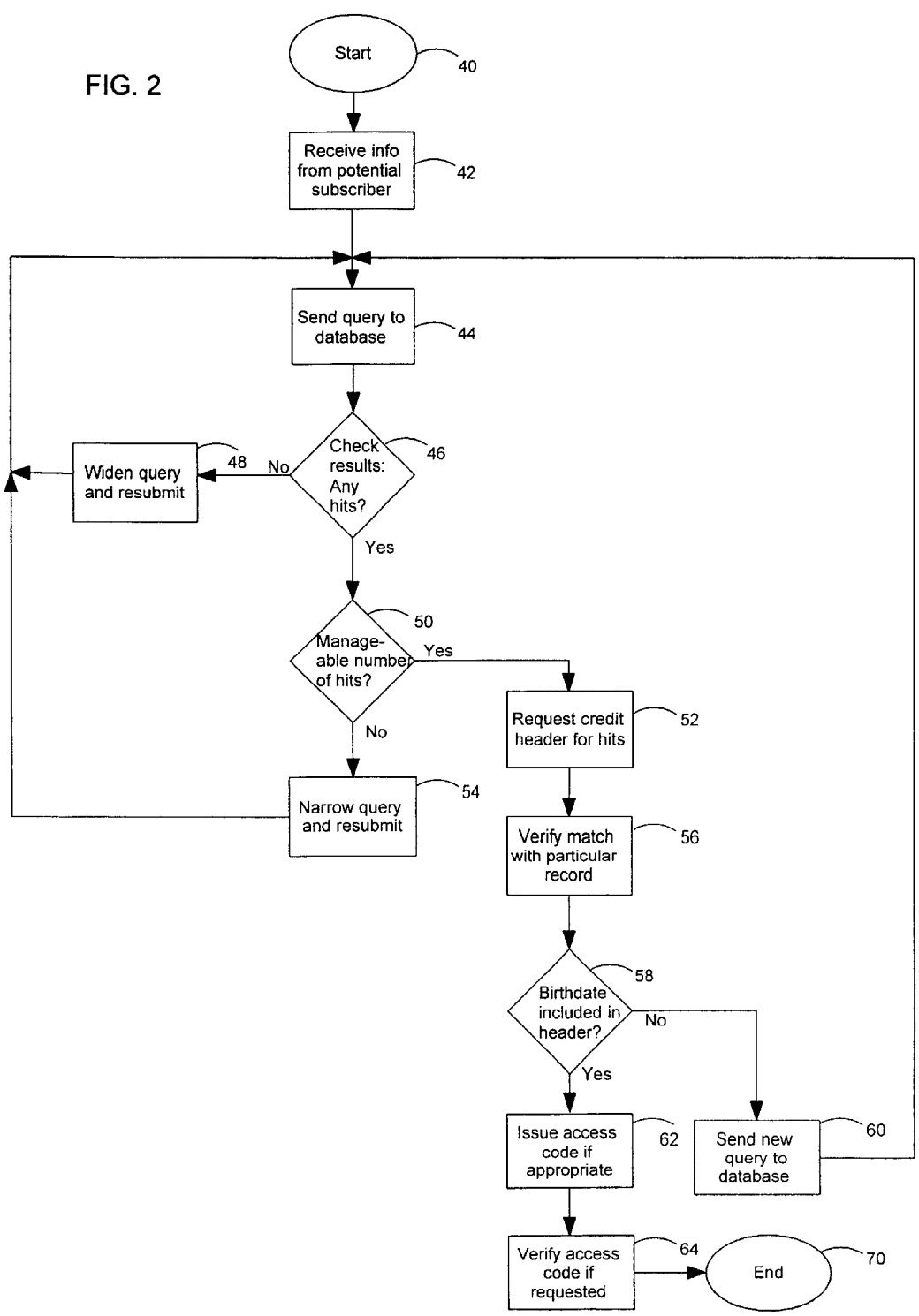

DATE OF BIRTH AUTHENTICATION SYSTEM AND METHOD USING DEMOGRAPHIC AND/OR GEOGRAPHIC DATA SUPPLIED BY A SUBSCRIBER THAT IS VERIFIED BY A THIRD PARTY

RELATED APPLICATIONS.

(none)

BACKGROUND OF THE INVENTION

1. Field of the Invention

The present invention relates to communications systems. More particularly, the present invention relates to a system and method for demographically selective distribution of information and entertainment.

2. Description of the Related Art

The Internet has rapidly become a major vehicle for information dispersal, education, entertainment, commerce, and other forms of communication and interaction. A number of websites including portal sites present news, entertainment, shopping opportunities, and other content, with revenue often derived from banner advertising. The advertising presented on such sites is usually broadcast indiscriminately to whomever visits the site, and thus is often of little interest to the website visitor, and indeed, is often considered to be a nuisance. On the other hand, it is difficult for a variety of reasons to induce people to enter personal information about themselves so that advertising can be customized and targetted.

The Internet also gives rise to jurisdictional complications. Website operators may wish to offer products and services, but at the same time wish to avoid conducting business with persons in certain foreign countries or other jurisdictions, so as to avoid exposing themselves to personal jurisdiction in foreign and unfamiliar courts.

Website operators may wish to restrict the persons who may view and interact with content of their websites to persons having certain demographic characteristics. Website operators may also wish to prevent visitors from entering personal information unless those visitors are of specified minimum age, in order to comply with child on-line privacy protection laws. Website operators may also wish to restrict access to adult entertainment content to those persons eighteen years or older in order to comply with legal restrictions. A number of adult verification services exist for providing personal identification numbers which can be used to access adult entertainment sites. However, those services are believed to rely upon the existence of a credit card in order to determine whether someone qualifies for access to such sites. Because some credit card issuers issue credit cards to minors, those services do not actually verify a person's age.

Various attempts have also been made to prevent children from accessing inappropriate content, particularly from Internet terminals installed in public libraries. Filtering software is available, but such software is prone to filtering out either too much or too little content, or both at the same time. At least one court has struck down as unconstitutional a county policy requiring libraries to install filtering software.

Chat groups and other forums exist on the Internet for the interchange of ideas between and among website visitors. Like any other communication, sometimes it is desirable to restrict discussions to only certain persons or certain groups of people.

SUMMARY OF THE INVENTION

The present invention provides a system and method for demographically based distribution of communication including information, entertainment, advertising, and other content via a computer network such as the Internet.

In one aspect, the invention comprises a method of distributing content over a computer network to persons based upon their respective demographic characteristics or other personal information, as verified by means of an access code.

In one embodiment, a user of the system contacts a centralized access code issuer in order to obtain an access code. The user or potential subscriber fills out an on-line application, the application information including subscription information including a name, address, an electronic mailing address, and/or other information. Rather than merely relying upon information inputted by the user, the access code issuer identifies a database, typically compiled by a third party, that contains demographic information for persons. The access code issuer queries the database. The query typically includes the user's name and geographic information including address, or other identifying indicia. The database determines whether the query information matches a record of a particular person within the database. If the information matches, the database responds by forwarding demographic information about the user to the access code issuer. The demographic information could include age and gender, and could also include geographic information in the form of confirmation that the user resides at the geographic address provided by the user. The demographic information could also include other information such as income, education, number of persons within the household, or any other information about the user that is contained within the database.

The issuer then issues an access code to the user or potential subscriber. The user then produces this access code when visiting a website of a content provider who is a member of a group of affiliated content providers. The access code could either be required in order to obtain privileges such as senior citizen discounts, or could be required to gain access to portions of the site such as adults-only sections. The access code could also be completely optional, with the inducement to the user that providing the requested access code will help the content provider and any advertisers on the site to format the substance and the presentation of the content and advertising so as to be more likely to be of interest and relevance to the user without the user having to painstakingly enter his or her demographic information at each site.

The affiliated content provider then uses the access code in order to obtain or verify the user's demographics. The content provider can either query the access code provider in real time in order to obtain and/or verify the user's demographic information, or the demographics could be encoded within the access code itself. If the access code is given only to persons meeting certain demographic characteristics and/or the access code must be maintained by payment of a fee, the content provider can query the access code provider in real time to determine whether the access code being provided by a visitor is a valid and current access code.

The invention has a number of potential applications, only a few of which are listed herein. The invention can be used to function as an on-line senior citizen discount card, thus ensuring that only those persons who are truly senior citizens will receive the discount offered. The invention can be used to format content presentations to persons based upon their demographics, or to target advertising and promotions to persons based upon their demographics to the mutual benefit of both the user and the advertiser. A seller of outdoor equipment could customize the presentation and promotions within its website based upon the demographics of the website visitor, recognizing for example that it would be more advantageous to promote fishing flies to persons having one set of demographics; and to promote snowboards to persons having a different set of demographics.

The system can also be used to provide proof to on-line entertainment sites that a person is at least 13 years old, 17 years old, 18 years old, or whatever required age, in order to watch a particular motion picture or motion picture trailer on-line depending upon the rating of the motion picture or trailer assigned by the motion picture ratings board. The invention can further function to provide proof that a person visiting a site is at least 13 years old, thus ensuring that a site can collect personal information from the user without violating certain child on-line privacy protection provisions which limit the collection of such information from someone under that age. The invention could be used in conjunction with an educational website to ensure that educational information such as reproductive health related information is given out only to visitors on an age-appropriate basis. Still further, the invention can be used to prevent persons having particular residences from accessing certain content or services available at a content provider's website, thereby reducing a company's risk of being subjected to personal jurisdiction in another state or even a foreign country. Other applications of the invention will be apparent to those skilled in the relevant arts.

In another aspect therefore, the invention comprises the method of establishing a content network comprising a plurality of affiliated content providers, using a computer to receive an on-line application from a potential subscriber including identifying indicia associated with the potential subscriber, operatively connecting to a database containing demographic information associated with a plurality of persons, formulating a query to an interface with the database including at least a portion of the identifying indicia, receiving a response thereto including demographic information such as age, residence, gender, and/or income associated with the identifying indicia, assigning an access code to the potential subscriber based on the demographic information, transmitting the access code to the potential subscriber using electronic communication, and transmitting to the affiliated content providers demographic information or other information associated with the access code, and the affiliated content providers providing or not providing content including information, advertising, offers, and entertainment, and arranging the presentation of that content, according to the demographic information associated with the access code.

The above-described objects of the present invention and other features and benefits of the present invention will become clear to those skilled in the art when read in conjunction with the following detailed description of a preferred illustrative embodiment and viewed in conjunction with the attached drawings in which like numbers refer to like parts, and the appended claims.

BRIEF DESCRIPTION OF THE DRAWINGS

FIG. 2 is a flow diagram for obtaining demographic information from a database.

DETAILED DESCRIPTION OF THE PREFERRED EMBODIMENTS

Figure 1:
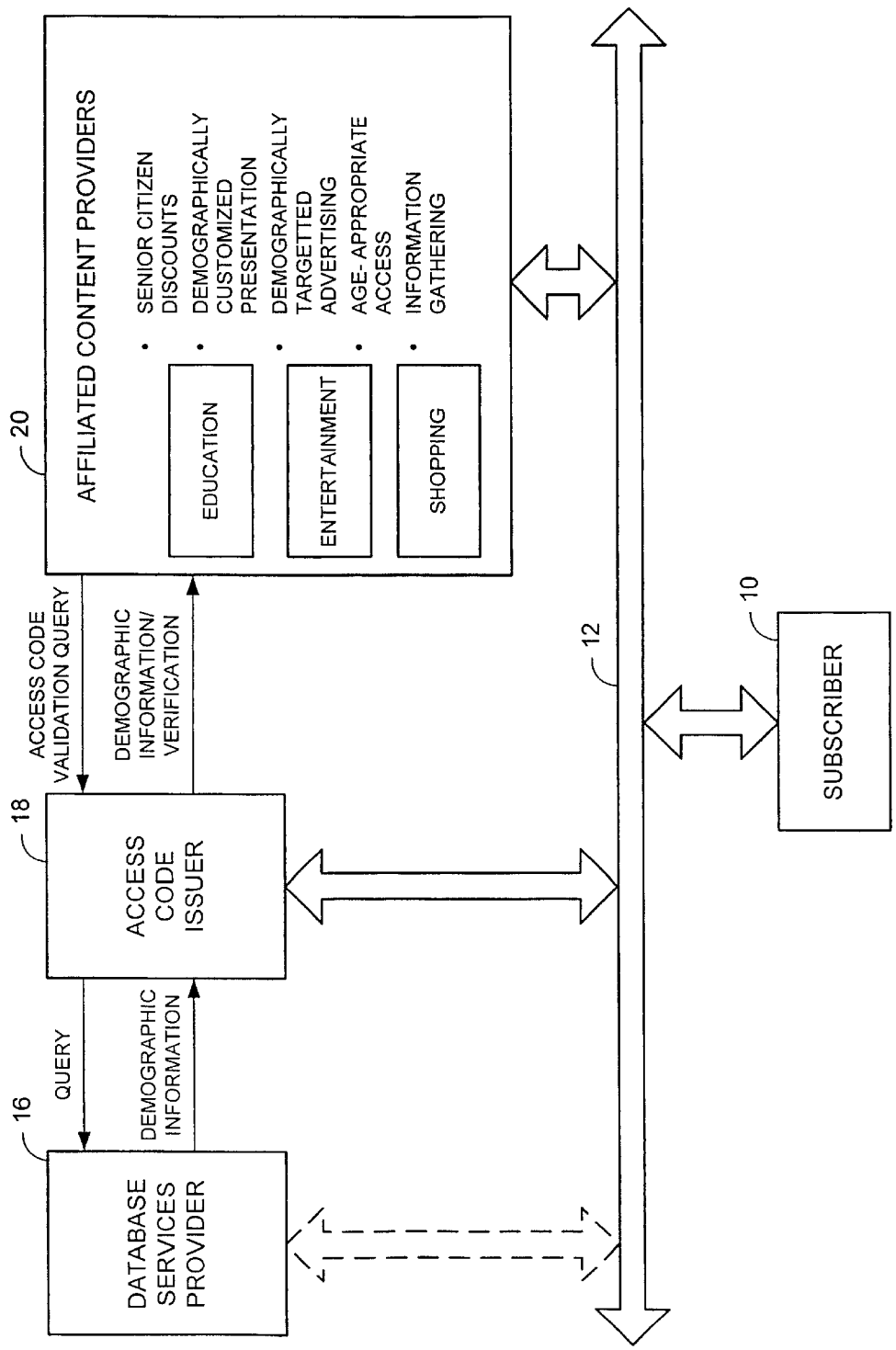
FIG. 1 is a system diagram of the present invention.

FIG. 1 is a system diagram. A user or potential subscriber 10 at one node establishes contact with an access code issuer 18 at another node via any one of known communication devices including a computer network such as Internet 12. Subscriber 10 fills out an application which may include an on-line application. The on-line application includes personal information such as name, geographic information including the subscriber's address, and possibly other contact information such as a telephone number, fax number, and an electronic mail address. If the subscriber must purchase a subscription in order to gain access to various content, the on-line application could include additionally a credit card number and type, and an expiration date and billing address associated with the credit card. In such a case, access code issuer 18 checks the validity of the credit card information, usually by contacting the credit card issuer via known methods, and also preferably evaluates whether the e-mail address is a valid e-mail address. An invalid e-mail address or an e-mail address having historically suspect domains may be one indication that the credit card number is stolen, being misused, or will otherwise result in a charge back to the merchant.

After receiving the on-line application, access code issuer 18 operatively connects to a database such as provided by a database services provider 16. The database includes demographic and/or other information regarding a plurality of persons. Because such databases are usually quite large, the database will typically though not necessarily be maintained by a third party such as a consumer information or consumer credit database compiler, and be maintained offsite from the access code issuer. The consumer information database may be compiled from various records including consumer credit records. One such provider of database services is CDB Infotek of Santa Ana, Calif. Communication with the database services provider can be a real time connection such as a local area network (LAN), a wide area network (WAN) such as the Internet, a telephone line including ISDN, T1, or OC-12, wireless communication, or combinations of the above. Access to such a database may be purchased. Real time access to the master database may be obtained via electronic communication by purchasing a subscription. Alternatively, the database provider may provide to the access code issuer a copy of the database so that the access code issuer can maintain a local copy. The copy may be transmitted via either electronic communication or via mass storage such as a magnetic type physically transported. In such a case, both the original compiler and vendor of the database, as well as in-house hardware and personnel, would constitute providers of records services. In a preferred embodiment the connection is a real time Internet connection with database provider 16. In this embodiment, the access code issuer 18 establishes with database provider 16 a connection known as a socket via Internet transmission control protocol (TCP). Once the socket is opened, handshaking is performed to exchange login, encryption, and other information in a manner well known to those within the computer networking arts. Database provider 16 may establish its own universal message format (UMS) or other protocol for such connections, in which case access code issuer 18 interfaces to the database using the appropriately customized interface.

FIG. 2 is a flow diagram of a method of the present invention. Access code issuer 18 receives information from a potential subscriber 42 and then formulates and sends a query to the database 44, regardless of whether the database is provided onsite or offsite. The query to the database typically includes a name and geographic information such as a current address of the user, as provided by the user. The database responds to the query by providing one of several types of responses. The database may respond by providing demographic information for all hit records; the database may provide a cardinal number of the hits obtained especially if more than one hit was obtained; or the database may respond that no hits were obtained.

Upon checking the results from the database query 46, if no hits from the database are obtained, the query may be widened and resubmitted to the database 48. For example, the next query could use only the zip code from the address obtained from the user as query criteria. On the other hand, if at least one hit is found, the system determines whether a predetermined, manageable number of hits was received 50. However, if too many hits are obtained, the query can be narrowed and resubmitted with additional information about the user 54. If necessary, this additional information can be obtained from the user by asking the user to provide the additional information.

Once a sufficiently small number of hits is obtained, ideally one hit, the access code issuer 18 requests that the database send a credit header for all of the hits 52. Next the access code issuer 18 verifies that the potential subscriber corresponds to a particular record within the database 56. Typically this is accomplished by verifying that the name and address provided by the potential subscriber matches the name and address within the database, or at least is close enough to determine that the record matches the potential subscriber. Once it is determined that the record within the database matches the potential subscriber 56, the demographic or other desired information is examined, and an appropriate access code is generated and issued to the potential subscriber if appropriate 62. In the case of a multi-purpose access code, the access code is associated with one or more demographic characteristics or other desired information. The demographic information may be either encoded within the access code itself, or may be stored at a location that is accessible to the access code issuer 18 and preferably on-site to the access code issuer so that the access code issuer 18 can forward that information to a content provider for verification if requested 64.

Access codes may be restricted in several situations. In the case of a limited purpose access code such as a senior citizen access code or adult access code, the access code will be issued only if the potential subscriber's age qualifies as a at least the minimum age. Specifically, if the access code is a limited purpose access code to be used for the purpose of receiving a senior citizen discount, or accessing content that may be harmful to minors, the demographic information retrieved must include chronological information such as a date of birth 58, and an access code is issued only to persons of the appropriate age. The determination of whether to issue such an access code is based on a comparison of the persons' respective dates of birth and the current date. An access code may also be issued only if other criteria are met. For example, an access code may be issued only to persons who are resident within the United States, to ensure that content providers provide access only to U.S. residents, thereby reducing the content provider's risk of being subject to personal jurisdiction and being haled into a foreign court based upon its contacts with citizens of that foreign country.

Due to the content and structure of the database being accessed, the desired geographic information may be not be available from the hit record. However, the database may contain additional information such as one or more previous addresses for the potential subscriber. In that case, a new query 60 may be formulated and submitted using, for example, the previous address or addresses. If a second hit is obtained using that previous address, and it is determined that the potential subscriber matches the record associated with the new query 56 including the previous address, then any demographic information which is available from that second record but is not available from the first record may be thus obtained and associated with the access code. For example, a date of birth 58 may not be available within the first record which is matched with the user's present address. However, a second address may be available within the database for that user containing at least one of the previous addresses and the birth date as well. In this way, the birth date can be obtained even if the first record based upon the user's present address does not contain a date of birth. When access code issuer 18 is satisfied that it has identified the user within the database 56 and has obtained the desired information from the database, access code issuer 18 closes the socket to database provider 16.

Preferably, the access code is generated 62 and sent to the user in real time, such as across the Internet in the same on-line communication session as the one in which the user requests the access code. Alternatively, the access code can be transmitted to the user at a later time or via an alternative communication means, such as via an e-mail message. Such delayed communication of the access code may be necessary where it is not possible to obtain or to verify the demographic information, or to verify the credit card or other billing arrangements for the subscription which the potential subscriber is requesting. The access code can be a personal identification number, a personal account number, a password, or other known types of access codes, either alone or in combinations.

The access code may be granted to any user who requests one, or may be granted only to persons for whom a minimum amount of demographic information can be obtained and/or verified. Still further, the access codes may be granted only to persons who meet certain criteria, such as being senior citizens, or living within a particular geographic area, or meeting other minimum age requirements such as 18 years old. When the access code is granted only to persons meeting specified criteria, then the verification process 64 can consist merely of access code issuer 18 verifying that the access code is a current and valid access code, in response to a query initiated by content provider 20, or via a periodic update of a list of valid access codes provided to content provider 20. Where the access code provider merely provides a "yes" or "no" validation of the access code, the information regarding the demographics of the access code holder is transmitted to content provider 20 by merely informing content provider 20 of the requirements for obtaining an access code, e.g., that the user be 18 or older, along with being a current paid subscriber. The access code could also be granted only to persons of lower than a maximum age, or within a specified age range. Such an access code may be used for marketing purposes and attracting visitors where it is perceived that people may wish to visit websites particularly because primarily people within a certain age range and/or a particular gender will be allowed to browse and/or post messages.

The access codes may also be multi-tiered. A first type of multi-tiered access code would be an access code in which people holding an access code that represents a higher level of access are granted access to all of the content at the site. An access code associated with a lower level of access would grant the user access to only certain portions of the site. Such a multi-tiered access may be desirable where access is paid for, and/or where access is granted on an age-appropriate basis. The access codes may also be horizontally multi-tiered. In a horizontally multitered access arrangement, content providers 20 would provide different content to different visitors based upon the demographic or other personal information associated with the holder of that access code. Advertisers at the site may wish to provide different advertising banner content based upon the users' level of education, gender, age, marital status, or other personal information. For example, a news site may wish to provide different news stories to persons based upon their respective personal information such as level of education, age or gender.

The access code issuer 18 need not necessarily be a single entity. Different access code issuers and verifiers could exist, although a single access code verifier or verification method may be preferred for reasons of speed and convenience.

The network of service providers or content providers 20 affiliated with the access code issuer 18 provides access to a variety of information, entertainment, and other services via the computer network such as Internet 12. Content providers 20 reside at respective nodes on the network. The affiliated content providers 20 may provide educational content; entertainment content including textual, video, and music content; news content including financial and sporting news; on-line shopping including offers for a variety of goods and services; and various other types of content and computer-based services provided by websites. The content providers may provide senior citizen discounts, or may provide access to sexually explicit adult entertainment materials only to those of age 18 or older. A content provider 20 may also provide educational information on an age-appropriate basis, such as reproductive-related health information that is written for the age level of the particular minor visitor to the site. The content providers may also provide demographically customized presentations, such as a clothing manufacturer who presents most prominently clothing that is most likely to be of interest to a visitor of the gender, age, income, and geographic residence of the user. The advertising may also be demographically targeted, such as an automobile pop up banner add which features an automobile that is more likely to be of interest to the user based upon his or her demographics. The access code can also be used for information gathering purposes by the content providers. A content provider may wish to know what type of person is visiting its site, ordering its products or services, not ordering its products or services, or spending how much time viewing specified portions of its site. The present invention allows the content providers to obtain and track this information, and to customize its presentation and advertising without unnecessarily burdening the visitor to its site by requesting the subscriber to enter such information at the site. Subscribers may naturally find that entering such information would be burdensome, and may also be naturally reluctant to provide such personal information.

When a user or subscriber 10 contacts a content provider 20 such as via the world wide web, content provider 20 may ask user 10 to provide an access code, either upon the user entering the site or anytime thereafter such as when the user indicates that he or she wishes to make a purchase or to enter a restricted portion of the content provider's website, or to post a message. The user is prompted to enter his or her access code. Preferably, content provider 20 authenticates and verifies the validity and level of access associated therewith by contacting access code issuer 18, or equivalently by contacting an entity which maintains a list of valid access codes and in one form or another the demographics and levels of access associated with the access codes. The authentication and verification preferably is done in real time via an electronic connection to access code issuer 18, such as via Internet 12, telephony, or any of other well known means of electronic communication. In one embodiment, content provider 20 transmits the received access code to access code issuer 18, and access code issuer 18 responds by indicating that the access code is valid. This would be the case where the access code represents merely "yes" or "no" type of access. In another embodiment, the access code issuer responds by transmitting at least a subset of the actual demographic information associated with the access code holder, such as that the user to whom the access code was issued is a 42 year old female who lives in Cleveland and who recently financed the purchase of a new vehicle. The access code issuer could even transmit to content provider 20 a list of websites that user 10 has visited using her access code, as well as a list of on-line purchases which user 10 has made, provided that other content providers provide such feedback to access code issuer 18.

Once content provider 20 has been apprised of whether the access code is valid and/or the actual demographics or other information regarding user 10, content provider 20 can provide or not provide the requested content to the user. If the visitor is a senior citizen, the content provider may now provide a downloaded or streaming video motion picture across the Internet at a discount, just as if the user were showing his or her driver's license at a theater box office in order to obtain the discount. The content provider may allow access to an adults-only portion of its website based on proof, provided by access code issuer 18, that the visitor truly has a date of birth that makes the user 18 years of age or older rather than that the visitor merely holds a credit card. The content provider may edit the content of its site so that certain material is not made available to visitors within a state or country in which merely displaying the content would violate local law. The content provider may sell advertising such as banner website advertising based on the actual demographics of the visitor to whom the advertising will be displayed.

A variety of incentives exist or could be provided for encouraging a user to obtain and use such an access code. An access code could be required in order to access a site, or in order to access certain restricted content within the site. Promotional offers or discounts could also be provided to subscribers who enter an access code upon entering a site. Additionally, users would have a natural incentive to obtain and use such a code, so that website content, promotions, and advertisements could be presented which would more likely be of interest to the user than if no information about the user were known. Additional incentives to obtain and use an access code could be formulated and promoted, and will be obvious to those skilled within the marketing arts. Some users may be reluctant to obtain and use such an access code due to apprehension that access code issuer 18 will reveal the user's identity to content providers 20, or to other persons or entities. Such a reluctance may be overcome in part by guaranteeing to users that only their demographic information or specified portions thereof will be revealed, and not their identities. When user 10 first signs up for an access code or at any time thereafter, access code issuer 18 could also allow user 10 to specify which demographic information may be revealed to content providers 20, and which demographic or other personal information will not be revealed.

It will be appreciated that the term "present invention" as used herein should not be construed to mean that only a single invention having a single essential element or group of elements is presented. Rather, each novel and nonobvious element constitutes a separate invention. Further, each novel and nonobvious combination of elements enabled by the present disclosure, whether the individual elements therein be old elements, new elements, or any combination thereof, further constitutes an additional separate invention.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents. In the following claims, those claims which contain the words "means for" are intended to be interpreted in accordance with 35 U.S.C. §112, paragraph 6; those claims which do not include the words "means for" are intended to not be interpreted in accordance with 35 U.S.C. §112, paragraph 6.

What is claimed is:

1. A method comprising the steps of:
   an access code issuer using a first system receiving an on-line application for an access code from a potential subscriber on a computer network, said on-line application comprising potential subscriber information including geographic information;
   using said potential subscriber information to query a second system that is off-site of the first system, that contains a database of information that was not gathered by or supplied by the access code issuer, and that is managed by a party that is different from the access code issuer;
   receiving from said off-site database a date of birth associated with said potential subscriber information;
   determining whether said geographic information from said potential subscriber matches geographic information associated with said date of birth within said database;
   determining from said date of birth whether said potential subscriber is of a predetermined age for obtaining access to information available from a plurality of information providers on said computer network;
   providing an access code to said potential subscriber if said potential subscriber is of said predetermined age as determined from said date of birth; and
   providing verification to said plurality of information providers that said access code is a valid access code.

2. The method of claim 1 wherein said off-site database is a database comprising consumer credit information.

3. The method of claim 1 wherein said information providers provide senior citizen discounts for on-line purchases.

4. The method of claim 1 wherein said information providers provide age-specific educational content.

5. The method of claim 1 wherein said information providers provide age-specific entertainment content.

6. The method of claim 1 wherein said predetermined age is 18 years or over, and said information providers maintain website which include adult entertainment.

7. The method of claim 3 wherein said potential subscriber information includes an electronic communications address, the method further including the step of:
   evaluating whether said electronic communications address is a valid address.

8. A method for performing on-line age verification by querying an off-site database comprising the steps of:
   an access code issuer using a first system receiving on-line first information from a potential subscriber;
   transmitting a first query to a second system that is off-site from the first system, that contains a database not gathered by or supplied by the access code issuer, and that is managed by a party that is different from the access code issuer, using said first information from said potential subscriber;
   receiving a first at least one record of information from said database including geographic information associated with said potential subscriber;
   verifying said first record of information is associated with said potential subscriber;
   transmitting a second query to said database using said first information from said potential subscriber and said geographic information associated with said potential subscriber from said database;
   receiving a second at least one record of information from said database including a date of birth associated with said potential subscriber;
   verifying said second record of information is associated with said potential subscriber;
   determining from said date of birth whether said potential subscriber qualifies for obtaining access to information available from at least one information provider on a computer network;
   providing an access code to said potential subscriber; and
   providing verification to said at least one information provider that said access code is valid.

9. The method according to claim 8, further comprising the step of:
   requesting on-line from said database a credit header for each said at least one record of information associated with said first information from said potential subscriber.

10. The method according to claim 9, wherein said credit header comprises age determination information associated with said potential subscriber.

11. The method according to claim 8, wherein said verification comprises notifying said at least one information provider that said access code was provided to said potential subscriber based on said potential subscriber's age.

12. A method for performing on-line demographic verification comprising the steps of:
   an access code issuer using a first system receiving on-line first information from a potential subscriber;
   transmitting on-line a first query to a second system that is off-site from the first system, that contains a database not gathered by or supplied by the access code issuer, and that is managed by a party that is different from the access code issuer, using said first information from said potential subscriber, said first query including geographic information associated with said potential subscriber;
   determining no record of information was found in said database from said first information associated with said potential subscriber;
   requesting on-line second information from said potential subscriber;
   transmitting on-line a second query to an off-site database using said second information from said potential subscriber,
   receiving on-line at least one first record of information from said database including a date of birth associated with said potential subscriber;

verifying said at least one first record of information is associated with said potential subscriber;

determining from said at least one first record of information whether said potential subscriber has a correct demographic for obtaining access to information available from at east one information provider on a computer network; and providing an access code to said potential subscriber.

13. An electronic age verification process for electronically verifying the age of an individual over a computer network including:

a. a first entity using a first system receiving geographic information about the individual and a name of the individual;

b. formulating a query containing at least the geographic information and the name of the individual;

c. delivering the query into a computer network for delivery to a second system that is off-site from the first system, that contains a database that contains database information about individuals, including age information, that was not gathered by or supplied by the first entity, and that is managed by a second entity that is different from the first entity;

d. receiving a response to the query from the third party that includes age information about the individual that was derived from a match between the geographic information and the name in the query and the database information in the database;

e. taking a first action if the age information meets a pre-determined criteria; and f. taking a second action that is different from the first action if the age information does not meet the pre-determined criteria.

14. The electronic age verification process of claim 13 wherein:

a. the personal information includes credit card information; and b. the first action includes allowing the individual to make a purchase.

15. The electronic age verification process of claim 13 wherein the age information is the age of the individual.

16. The electronic age verification process of claim 13 wherein the age information is the date of birth of the individual.

17. The electronic age verification process of claim 13 wherein the age information is whether the age of the individual does or does not meet a pre-determined criteria.

18. The electronic age verification process of claim 13 wherein the predetermined criteria is whether the individual is at least a certain age.

19. The electronic age verification process of claim 13 wherein the first action includes granting the individual access to a portion of a website that the individual would not be granted access to by the second action.

20. The electronic age verification process of claim 19 wherein the portion of the website contains adult-oriented material not suitable for viewing by children.

21. The electronic age verification process of claim 13 wherein the first action includes providing an access code.

22. The electronic age verification process of claim 13 wherein the first action includes displaying promotional material to the individual that would not be displayed to the individual by the second action.

23. The electronic age verification process of claim 13 wherein the network includes the Internet.

* * * * *